US008836663B2

(12) United States Patent
Kim

(10) Patent No.: US 8,836,663 B2
(45) Date of Patent: Sep. 16, 2014

(54) TOUCH SENSITIVE DEVICE FOR PROVIDING MINI-MAP OF TACTILE USER INTERFACE AND METHOD OF CONTROLLING THE SAME

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 13/741,922

(22) Filed: Jan. 15, 2013

(65) Prior Publication Data
US 2014/0168107 A1    Jun. 19, 2014

(30) Foreign Application Priority Data

Dec. 17, 2012  (KR) .......................... 10-2012-0147237

(51) Int. Cl.
  *G06F 3/041*  (2006.01)
(52) U.S. Cl.
  CPC ...................................... *G06F 3/041* (2013.01)
  USPC ........................................................ 345/173
(58) Field of Classification Search
  CPC ..... G06F 3/041; G06F 3/0412; G06F 3/0414;
       G06F 3/0416; G06F 3/048; G06F 3/0488;
       G06F 3/0481; G06F 3/04812; G06F 3/0482;
           G06F 3/04842; G06F 3/04845; G06F
       2203/013; G06F 2203/014; G06F 2203/04809;
           G06F 2203/04808; A61F 4/00; H01H
                                            2217/014
  See application file for complete search history.

(56) References Cited

U.S. PATENT DOCUMENTS

| 5,455,906 | A  | * | 10/1995 | Usuda ........................... 345/536 |
| 6,278,441 | B1 |   | 8/2001  | Gouzman et al. |
| 7,952,566 | B2 | * | 5/2011  | Poupyrev et al. ............. 345/173 |
| 8,004,501 | B2 |   | 8/2011  | Harrison |
| 2006/0143342 | A1 | * | 6/2006 | Kim et al. ....................... 710/73 |
| 2008/0068351 | A1 | * | 3/2008 | Rosenberg et al. ........... 345/173 |
| 2009/0167701 | A1 | * | 7/2009 | Ronkainen ..................... 345/173 |
| 2009/0219252 | A1 | * | 9/2009 | Jarventie et al. .............. 345/173 |
| 2009/0273583 | A1 |   | 11/2009 | Norhammar |
| 2009/0294186 | A1 |   | 12/2009 | Fontanella et al. |
| 2010/0020036 | A1 |   | 1/2010 | Hui et al. |
| 2010/0156814 | A1 | * | 6/2010 | Weber et al. .................. 345/173 |
| 2010/0328229 | A1 |   | 12/2010 | Weber et al. |
| 2012/0030568 | A1 | * | 2/2012 | Migos et al. ................... 715/702 |
| 2012/0044164 | A1 | * | 2/2012 | Kim et al. ....................... 345/173 |
| 2012/0262386 | A1 | * | 10/2012 | Kwon et al. .................. 345/173 |
| 2014/0160073 | A1 | * | 6/2014 | Matsuki ......................... 345/174 |

* cited by examiner

*Primary Examiner* — Dwayne Bost
*Assistant Examiner* — Ivelisse Martinez Quiles
(74) *Attorney, Agent, or Firm* — Birch, Stewart, Kolasch & Birch, LLP

(57) ABSTRACT

A touch sensitive device includes a touch sensitive panel for providing a tactile user interface including at least one tactile object, a sensor unit configured to detect contact with the touch sensitive panel and generate contact region information of a contact region in which the contact is detected, a tactile feedback unit configured to generate tactile feedback of a mini-map of the tactile user interface in the contact region indicated by the generated contact region information, and a controller configured to control the touch sensitive panel, the sensor unit, the tactile feedback unit and the tactile user interface. The mini-map of the tactile user interface includes a duplicate of the tactile object provided on the touch sensitive panel, and the duplicate of the tactile object indicates a direction from the contact region indicated by the contact region information to the tactile object.

20 Claims, 8 Drawing Sheets

TOUCH SENSITIVE DEVICE FOR PROVIDING MINI-MAP OF TACTILE USER INTERFACE AND METHOD OF CONTROLLING THE SAME

This application claims the benefit of Korean Patent Application No. 10-2012-0147237, filed on Dec. 17, 2012, which is hereby incorporated by reference as if fully set forth herein.

BACKGROUND OF THE INVENTION

1. Field of the Invention

The present specification relates to a touch sensitive device, and more particularly, to a device for providing a tactile user interface and a mini-map of the tactile user interface to a user and a method of controlling the same.

2. Discussion of the Related Art

A digital device may provide information to a user through a user interface and receive user input. The user interface may include a graphical user interface for providing visual information and a tactile user interface for providing tactile information. Since the graphical user interface is visually provided to a user, the user may confirm the graphical user interface within the visual field of the user. Unlike the graphical user interface, the tactile user interface is provided to the user through tactile sensation. Accordingly, the user may perceive the tactile user interface only in a restricted region in which a finger and a digital device are in contact each other.

SUMMARY OF THE INVENTION

Accordingly, the present specification is directed to a touch sensitive device for providing a mini-map of a tactile user interface to a user and a method of controlling the same that substantially obviate one or more problems due to limitations and disadvantages of the related art.

An object of the present specification is to provide a touch sensitive device for providing a mini-map of a tactile user interface to a user and a method of controlling the same. In particular, in the present specification, it is necessary for a touch sensitive device to provide summary information of a tactile user interface to a user through a restricted region.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a touch sensitive device includes a touch sensitive panel for providing a tactile user interface including at least one tactile object, a sensor unit for detecting contact with the touch sensitive panel and generating contact region information of a contact region in which contact is detected, and a tactile feedback unit for generating tactile feedback of a mini-map of the tactile user interface in the contact region indicated by the generated contact region information. The mini-map of the tactile user interface includes a duplicate of the tactile object provided on the touch sensitive panel, and the duplicate of the tactile object indicates a direction from the contact region indicated by the contact region information to the tactile object.

In another aspect of the present specification, a method of controlling a touch sensitive device includes providing a tactile user interface including at least one tactile object on a touch sensitive panel, detecting contact with the touch sensitive panel and generating contact region information of a contact region in which contact is detected, and generating tactile feedback of a mini-map of the tactile user interface in the contact region indicated by the generated contact region information. The mini-map of the tactile user interface includes a duplicate of the tactile object provided on the touch sensitive panel, and the duplicate of the tactile object indicates a direction from the contact region indicated by the contact region information to the tactile object.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Figure 1:
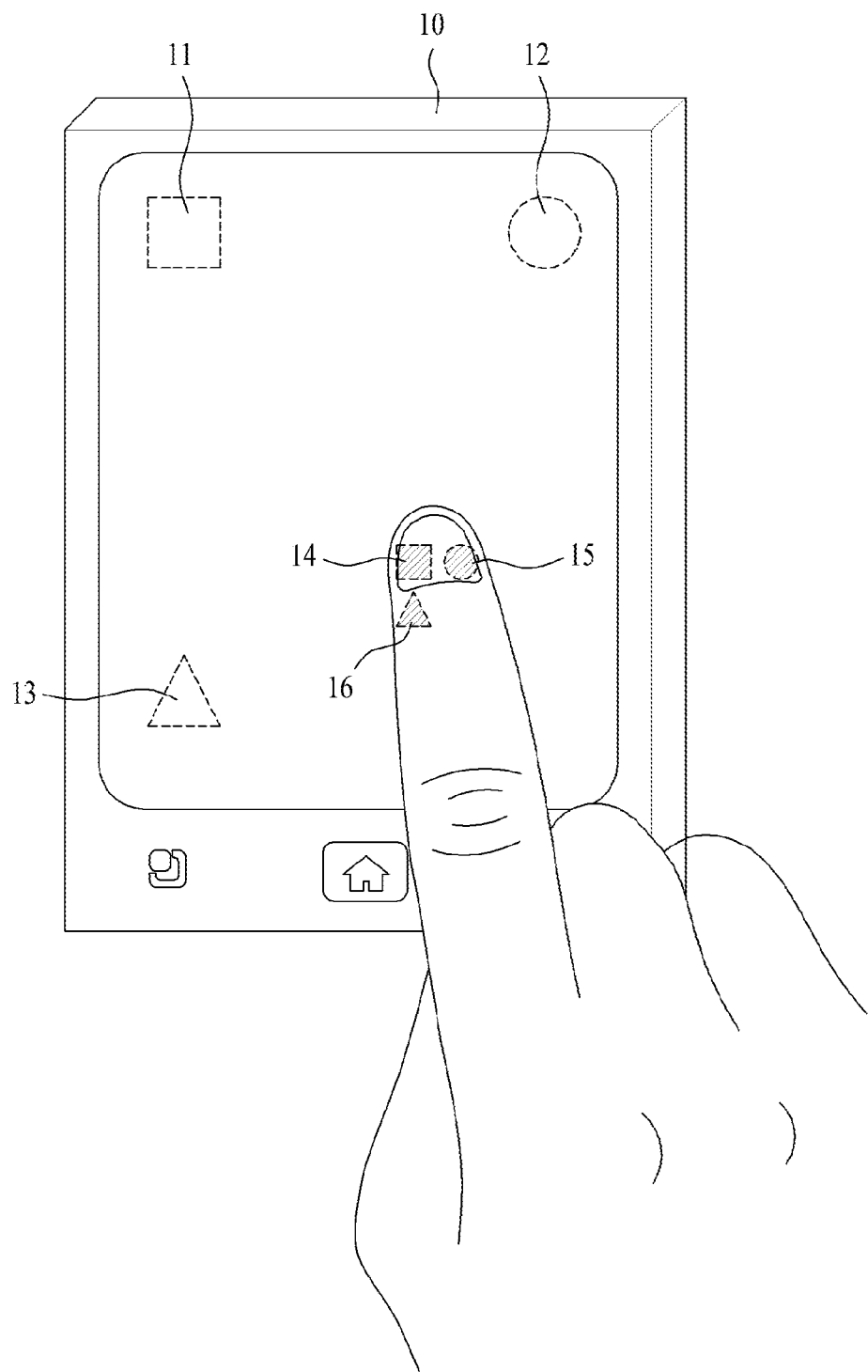
FIG. 1 is a diagram showing a method of providing a mini-map of a tactile user interface to a user according to an embodiment of the present specification.

Although reference will now be made in detail to the preferred embodiments of the present specification, examples of which are illustrated in the accompanying drawings, the scope of the present specification is not limited by the following embodiments.

Although the terms used in the present specification are selected from generally known and used terms, terms used herein may be changed depending on operator's intention or customs in the art, appearance of a new technology, or the like. In addition, some of the terms mentioned in the description of the present specification have been selected by the applicant at his or her discretion, the detailed meanings of which are described in relevant parts of the description herein.

Furthermore, the present specification should be understood, not simply by the actual terms used but by the meanings of each term lying within.

A touch sensitive device may provide a user interface such that a user controls the touch sensitive device. The user interface may include a visual user interface visually perceived by a user and a tactile user interface perceived through tactile sensation according to a provision method. The tactile user interface may include a tactile object and a tactile button. The touch sensitive device may detect touch input of touching or pressing the tactile button to execute an application corresponding to the tactile button or execute the function of the tactile button for controlling the device. The touch sensitive device may provide a tactile user interface using tactile feedback.

The tactile user interface may include a tactile object and a duplicate of the tactile object provided to a detected contact region in which user touch input is detected. The duplicate of the tactile object may be an indicator indicating at least one of the position and the direction of the tactile object included in the tactile user interface or tactile feedback of the indicator. In the present specification, a region, in which a duplicate is located, in a contact region may be referred to as a mini-map. The mini-map is a map obtained by reducing a tactile user interface and may be an element representing a relative position relationship between a contact region and a tactile object or tactile feedback of the element. The mini-map is a set of duplicates including elements. In addition, the tactile feedback of the mini-map may be generated in a contact region. In the following description, a user interface may be referred to as an interface and a tactile user interface may be referred to as a tactile interface.

A touch sensitive device may be an electronic device for providing a user interface to a user through a touch sensitive panel. A touch sensitive device may include a smart phone, a personal digital assistant (PDA), a cellular phone, an MP3 music player, a head mounted display (HMD), a laptop, a smart pad, a tablet personal computer (PC), a television or an electronic device including a touch sensitive panel, such as a smart table.

FIG. 1 is a diagram showing a method of providing a mini-map of a tactile user interface to a user according to an embodiment of the present specification. A touch sensitive device may provide a tactile user interface to a user. Providing the tactile user interface to the user means that the touch sensitive device informs the user as to which user interface is present using tactile feedback. The tactile user interface of the touch sensitive device may include at least one tactile object. In addition, the touch sensitive device may reduce the tactile user interface provided to the user to generate a mini-map of the tactile user interface. The mini-map of the tactile user interface may be provided to the user through tactile feedback. The user may perceive the tactile user interface provided by the touch sensitive device through the mini-map of the tactile user interface.

The touch sensitive device 100 may provide the tactile user interface to the user. The tactile user interface may include at least one tactile object. The tactile object may be located on a touch sensitive panel of the touch sensitive device 10. For example, the touch sensitive device 10 may include a first tactile object 11 located at a left upper side of the touch sensitive panel, a second tactile object 12 located at a right upper side of the touch sensitive panel and a third tactile object 13 located at a left lower side of the touch sensitive panel. Each tactile object may have at least one of different attributes such as shape, size and position and may generate different tactile feedback. The tactile feedback of each tactile object may be generated according to at least one of the shape and size of each tactile object. For example, in case of the first tactile object 11, the touch sensitive device 10 may generate tactile feedback for the first tactile object in a circular region as shown in FIG. 1.

In the touch sensitive device 10 of FIG. 1, the plurality of tactile objects are located at the left upper side, right upper side and left lower side of the touch sensitive panel. However, since a tactile object is not present in a region contacted by the user, the user may not receive tactile feedback corresponding to the tactile object. Therefore, the user may not be aware where the tactile object is located on the touch sensitive panel.

Accordingly, the touch sensitive device 10 reduces the tactile user interface to be provided to the user and provides the mini-map of the tactile user interface to the user. The mini-map is a map obtained by reducing a tactile user interface and may be an element representing a relative position relationship between a contact region and a tactile object or tactile feedback of the element. The mini-map is a set of duplicates and may include one or more duplicates.

The touch sensitive device 10 may generate a duplicate of at least one tactile object included in a tactile user interface and include the duplicate in a mini-map. The duplicate may be an indicator indicating at least one of position and direction of the tactile object included in the tactile user interface or tactile feedback of the indicator.

For example, the touch sensitive device 10 may include, in the mini-map, a first duplicate 14 corresponding to the first tactile object 11, a second duplicate 15 corresponding to the second tactile object 12 and a third duplicate 16 corresponding to the third tactile object 13. The duplicate of the tactile object may be generated based on attributes of the tactile object. According to embodiments, the duplicate may be generated as a miniature of the tactile object. For example, the duplicate may be similar to the tactile object in terms of shape, size and tactile feedback. Alternatively, the duplicate may be an element indicating at least one of the number, positions and directions of tactile objects or tactile feedback of the element. The touch sensitive device 10 may locate the duplicate corresponding to each tactile object within the mini-map in a direction of each tactile object based on the center of a contact region.

The touch sensitive device 10 may detect in which region contact with the touch sensitive panel occurs using a sensor unit. In addition, the touch sensitive device 10 may track contact moved from a first region to a second region using the sensor unit. The touch sensitive device 10 may generate contact region information of a contact region in which contact occurs. The contact region information may indicate in which region of the touch sensitive panel contact occurs and include at least one of the position information of the contact region, the position information of the center of the contact region and the area information of the contact region. The touch sensitive device 10 may locate the mini-map of the tactile user interface in the contact region indicated by the contact region information. The touch sensitive device 10 generates the tactile feedback of the mini-map in the contact region corresponding to the contact region information such that the user perceives the mini-map.

The touch sensitive device 10 may set the contact region corresponding to the contact region information as the region of the mini-map. The touch sensitive device 10 may generate tactile feedback corresponding to the first duplicate 14 at a left upper side of the mini-map, tactile feedback corresponding to the second duplicate 15 at a right upper side of the mini-map and tactile feedback corresponding to the third duplicate 16 at a left lower side of the mini-map. Accordingly, the touch sensitive device 100 may provide the user with information indicating that the first tactile object 11 is located at the left upper side of the touch sensitive panel, the second tactile object 12 is located at the right upper side of the touch sensitive panel and the third tactile object 13 is located at the right lower side of the touch sensitive panel. That is, the touch sensitive device 10 may inform the user of presence/absence of each tactile object and a direction thereof from a contact region. Accordingly, the user may perceive in which direction each tactile object is located from a position touched by the user through the mini-map. Accordingly, the user may perceive the position and direction of the tactile object based on the position and direction of the duplicate included in the mini-map.

According to another embodiment of the present specification, the touch sensitive device may divide the contact region into a plurality of sub contact regions. That is, the touch sensitive device may divide the mini-map into a plurality of sub contact regions. The touch sensitive device may generate tactile feedback with respect to sub contact regions of directions, in which the tactile objects are located, among the plurality of sub contact regions. For example, the touch sensitive device may generate an X axis and a Y axis based on the center of the contact region. The touch sensitive device may divide the contact region divided by the X axis and the Y axis into a first quadrant, a second quadrant, a third quadrant and a fourth quadrant. The touch sensitive device may generate tactile feedback of the first quadrant of the contact region in correspondence with the tactile object located at the right upper side of the touch sensitive panel. In addition, the touch sensitive device may generate tactile feedback of the second, third and fourth quadrants of the contact region in correspondence with the tactile objects located at the left upper side, left lower side and right lower side of the touch sensitive panel. Accordingly, the touch sensitive device may generate tactile feedback in the first quadrant of the contact region and inform the user of the presence and direction of the tactile object, if the tactile object is present at the right upper side of the Contact region. In addition, the touch sensitive device may not generate tactile feedback in the third quadrant of the contact region if a tactile object is not present in the left lower side of the contact region.

The touch sensitive device may inform the user of the direction in which the tactile object is located and the direction in which the tactile object is not located through the mini-map. That is, the touch sensitive device may differently generate tactile feedback of the sub contact regions and provide information about the tactile objects to the user, instead of generation of the duplicates in the mini-map. A tactile feedback unit of the touch sensitive device may generate different tactile feedback with respect to the sub contact regions of the directions, in which the tactile objects are located, among the plurality of sub contact regions. The touch sensitive device may control the strength of the tactile feedback between the sub contact region of the direction, in which the tactile object is located, and the tactile object.

Figure 2:
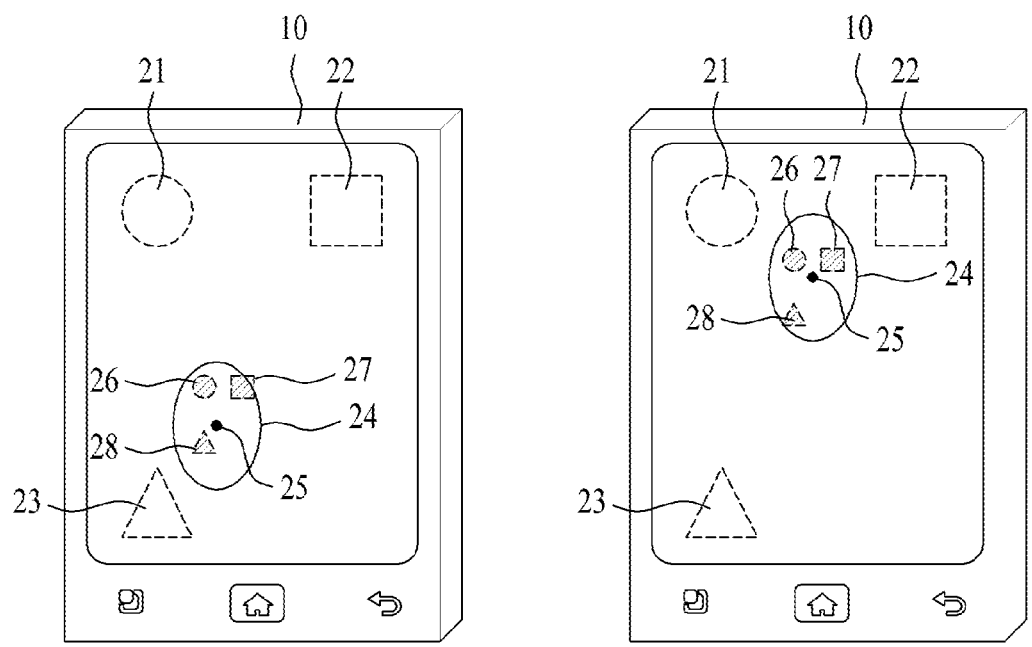
FIG. 2 is a diagram showing a relationship between the position of a duplicate in a mini-map and a contact position according to an embodiment of the present specification.

FIG. 2 is a diagram showing a relationship between the position of a duplicate in a mini-map and a contact position according to an embodiment of the present specification. The touch sensitive device may detect contact between a user's finger and the touch sensitive panel. The touch sensitive device may track the contact region in which contact is detected and generate contact region information. The contact region information may include information about in which region of the touch sensitive panel contact occurs and include at least one of the position information of the contact region, the position information of the center of the contact region and the area information of the contact region. The touch sensitive device may update the contact region information as contact is moved, such that the user is aware of the contact position on the touch sensitive panel. The touch sensitive device may adaptively change the position of the duplicate included in the mini-map in correspondence with the contact region information. That is, the touch sensitive device may change the position of the duplicate of each tactile object in correspondence with a distance between the center of the contact region indicated by the contact region information and each tactile object.

The touch sensitive device 10 may set the position of the duplicate using the following method. The touch sensitive device 10 may locate the duplicate of the tactile object in a direction, in which the tactile object is located, from the center of the contact region. The touch sensitive device 10 may set the position of the duplicate of the tactile object on a virtual line connecting the tactile object and the contact region. The touch sensitive device 10 may measure a first distance from the center of the contact region to the tactile object, reduce the measured first distance by a predetermined ratio, and set the reduced distance to a second distance from the center of the contact region to the duplicate. The touch sensitive device 10 may locate the duplicate of the tactile object at a position separated from the center of the contact region by the second distance on the virtual line.

In FIG. 2, the touch sensitive device 10 may locate a first tactile object 21, a second tactile object 22 and a third tactile object 23 on the touch sensitive panel. The touch sensitive device 10 may locate a first duplicate 26 corresponding to the first tactile object 21, a second duplicate 27 corresponding to the second tactile object 22 and a third duplicate 28 corresponding to the third tactile object 23 in a contact region 24 of the touch sensitive panel. The touch sensitive device 10 may locate the first duplicate 26 in the direction of the first tactile object 21, locate the second duplicate 27 in the direction of the second tactile object 22, and locate the third duplicate 28 in the direction of the third tactile object 23, from the center 25 of the contact region within the contact region 24.

The touch sensitive device 10 may detect contact with the touch sensitive panel and generate contact region information. In the left side of FIG. 2, the touch sensitive device 100 may provide a mini-map according to the above-described method. The touch sensitive device 10 may measure a distance from the center 25 of the contact region 24 to each tactile object according to the generated contact region information. The touch sensitive device 10 may set the position of the duplicate of each tactile object within the mini-map according to the measured distance. For example, in the left side of FIG. 2, the center 25 of the contact region may be located closer to the third tactile object 23 than the first tactile object 21 and the second tactile object 22. That is, the touch sensitive device 10 locates closer to the third tactile object 23 located at the left lower side of the touch sensitive panel. Therefore, the touch sensitive device 10 may locate the third duplicate 28 to be closer to the center 25 of the contact region than the first duplicate 26 and the second duplicate 27. The touch sensitive device 10 may measure a first distance from the center 25 of the contact region to the third tactile object 23 and set a second distance obtained by reducing the measured first distance by a predetermined ratio to a distance from the center 25 of the contact region to the third duplicate 28. Therefore, the touch sensitive device 10 may locate the third duplicate 28 at a place separated from the center 25 of the contact region by the second distance in the direction of the third tactile object 23. The touch sensitive device 10 may set the positions of the first duplicate 26 and the second duplicate 27 using a method similar to the above-described method.

If the contact region information is changed or updated, the touch sensitive device 10 may change the positions of the duplicates included in the mini-map according to the changed contact region information. In the right side of FIG. 2, the touch sensitive device 10 may update the distance from the center 25 of the contact region 24 to each tactile object according to the changed or updated contact region information. The touch sensitive device 10 may set the position of the duplicate of each tactile object within the mini-map according to the updated distance. For example, in the right side of FIG. 2, the center 25 of the contact region may be located closer to the first tactile object 21 and the second tactile object 22 than the third tactile object 23. That is, the touch sensitive device 10 locates closer to the first tactile object 21 and the second tactile object 22 located at the upper side of the touch sensitive panel. Accordingly, the touch sensitive device 10 may locate the first duplicate 26 and the second duplicate 27 to be closer to the center 25 of the contact region than the third duplicate 28. The touch sensitive device 10 may measure a first distance from the center 25 of the contact region to the first tactile object 21 and set a second distance obtained by reducing the measured first distance by a predetermined ratio to a distance from the center 25 of the contact region to the first duplicate 26. Therefore, the touch sensitive device 10 may locate the first duplicate 26 at a place separated from the center 25 of the contact region by the second distance in the direction of the first tactile object 21. The touch sensitive device 10 may set the positions of the second duplicate 27 and the third duplicate 28 using a method similar to the above-described method.

As described above, the touch sensitive device 10 may generate contact region information and set the position of at least one duplicate included in the mini-map, if user contact is detected. In addition, the touch sensitive device 10 may update the contact region information and adaptively update the position of at least one duplicate included in the mini-map, if the position of the detected contact is changed.

Figure 3:
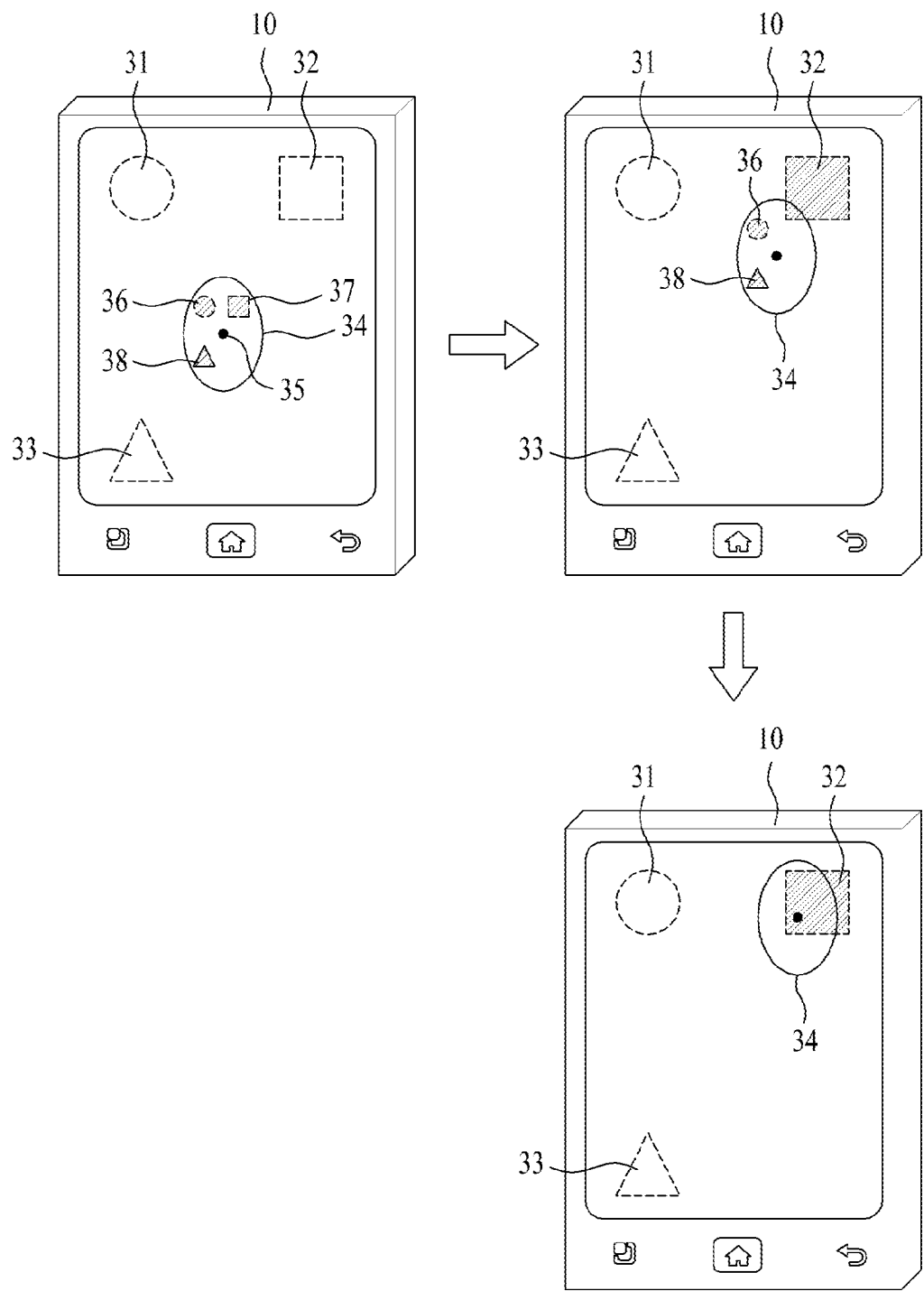
FIG. 3 is a diagram illustrating a method of providing a mini-map if a tactile object and a mini-map overlap according to an embodiment of the present specification.

FIG. 3 is a diagram illustrating a method of providing a mini-map if a tactile object and a mini-map overlap according to an embodiment of the present specification. The touch sensitive device 10 may change at least one duplicate included in the mini-map and generate tactile feedback of the mini-map, if the mini-map and the tactile object overlap. The touch sensitive device 10 may remove at least one duplicate included in the mini-map or add at least one duplicate to the mini-map according to the overlap area or ratio of the mini-map and the tactile object to provide the mini-map.

If the contact region indicated by the contact region information overlaps with the tactile object by a ratio within a first ratio range, the touch sensitive device 10 may remove a duplicate of an overlapped tactile object from the mini-map of a tactile user interface. That is, if a contact region and a tactile object region overlap by a predetermined area or more, the touch sensitive device 10 may remove the duplicate of the overlapped tactile object from the mini-map located in the contact region. The touch sensitive device 10 may set one of a ratio of the overlapped region to the region of the tactile object, a ratio of the overlapped region to the region of the mini-map, or a ratio of the overlapped region to the contact region as the above-described overlap ratio. If the contact region indicated by the contact region information overlaps with the tactile object by a ratio within a second ratio range, the touch sensitive device 10 may remove the mini-map of the tactile user interface and generate tactile feedback of the overlapped tactile object. The touch sensitive device 10 may set the first ratio range and the second ratio range to predetermined values. The touch sensitive device 10 may set the ratio within the first ratio range to be equal to or less than the ratio within the second ratio range.

In the left upper side of FIG. 3, the touch sensitive device 10 may locate a first tactile object 31, a second tactile object 32 and a third tactile object 33 on the touch sensitive panel. The touch sensitive device 10 may generate tactile feedback of a mini-map in a contact region 34 on the touch sensitive panel. The touch sensitive device 10 may locate a first duplicate 36 corresponding to the first tactile object 31, a second duplicate 37 corresponding to the second tactile object 32 and a third duplicate 38 corresponding to the third tactile object 33 in the contact region 34. The touch sensitive device 10 may locate the first duplicate 36 in the direction of the first tactile object 31, locate the second duplicate 37 in the direction of the second tactile object 32 and locate the third duplicate 38 in the direction of the third tactile object, based on the center 35 of the contact region within the contact region 34.

The right upper side of FIG. 3 shows the case in which the contact region 34 overlaps with the tactile object by the ratio within the first ratio range. The user may perceive that the second tactile object 32 is present in the right upper side of the center 35 of the contact region through the second duplicate provided in the contact region 34. The user may move the contact region in the right upper direction in order to control the second tactile object 32. In this case, the touch sensitive device 10 may detect that the position of the contact region 34 is changed. The touch sensitive device 10 may track the contact region 34 and update the contact region information. As shown in the right upper side of FIG. 3, if the contact region indicated by the contact region information overlaps with the second tactile object 32 by the ratio within the first ratio range, the touch sensitive device 10 may remove the second duplicate 37 included in the mini-map. The touch sensitive device 10 may generate tactile feedback of the second tactile object 32 corresponding to the second duplicate 37 in the contact region. Therefore, the touch sensitive device 10 may remove the overlapped second duplicate 37 and locate the second tactile object 32 in the contact region. Accordingly, the touch sensitive device 10 may provide the tactile feedback of the second tactile object 32 to the user. The touch sensitive device 10 may generate the tactile feedback of the second tactile object 32 corresponding to the second duplicate 37 to inform the user that the contact region 34 approaches the second tactile object 32.

The right lower side of FIG. 3 shows the case in which the contact region 34 overlaps with the tactile object by the ratio within the second ratio range. As shown in the right lower side of FIG. 3, if the contact region indicated by the contact region information overlaps with the second tactile object 32 by the ratio within the second ratio range, the touch sensitive device 10 may remove the first duplicate 36 and the third duplicate 38 included in the mini-map. In other words, if the contact region overlaps with the second tactile object 32 by the ratio within the second ratio range, a plurality of duplicates included in the mini-map may be removed. As another embodiment, if the contact region overlaps with the second tactile object 32 by the ratio within the second ratio range, the touch sensitive device 10 may remove the mini-map. In this case, the touch sensitive device 10 may generate tactile feedback of the second tactile object 32 in the contact region. The touch sensitive device 10 may generate tactile feedback of the second tactile object 32 corresponding to the second duplicate 37 so as to inform the user that the contact region 34 is located on the second tactile object 32. The user may perceive the tactile feedback of the second tactile object 32 and touch and execute the second tactile object 32. If the contact region is moved in the inverse order of the above-described process according to another embodiment, the duplicate of at least one tactile object may be added to the mini-map.

Figure 4:
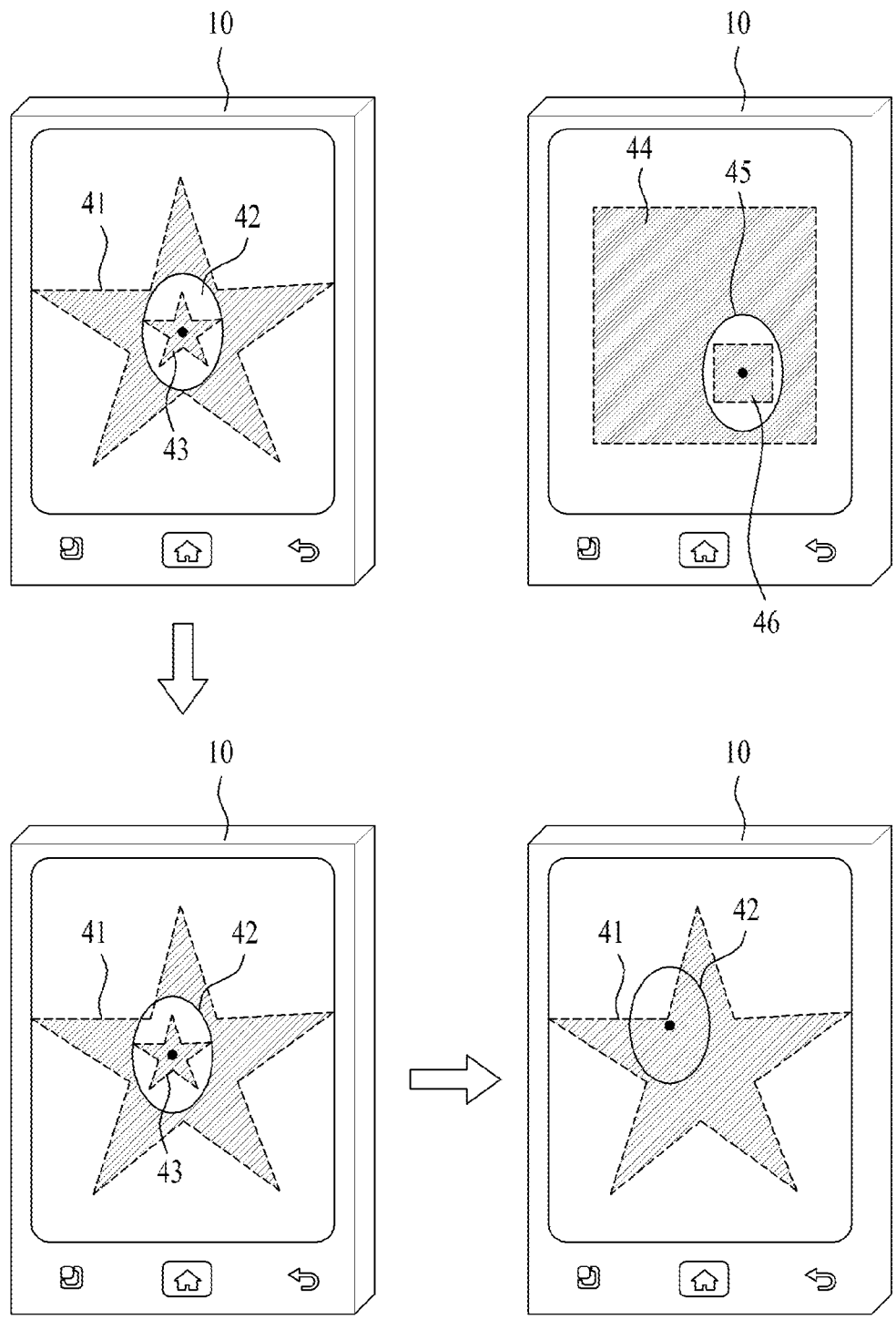
FIG. 4 is a diagram illustrating a method of generating a duplicate within a region of a tactile object according to an embodiment of the present specification.

FIG. 4 is a diagram illustrating a method of generating a duplicate within a region of a tactile object according to an embodiment of the present specification. The touch sensitive device 10 may provide a mini-map within the region of a tactile object if the region of the tactile object is greater than a contact region. The touch sensitive device 10 may generate a duplicate of the tactile object within the region of the tactile object. The touch sensitive device 10 may generate the duplicate which is a miniature of the tactile object such that the user perceives the shape of the tactile object through one touch. Therefore, the user may perceive the shape of the tactile object even when the entire region of the tactile object is not touched.

In the left upper side of FIG. 4, the touch sensitive device 10 may generate tactile feedback of a tactile object 41 having a star shape. If the region of the tactile object 41 includes a contact region 42, the touch sensitive device 10 may locate a duplicate 43 of the tactile object 41 including the contact region 42 in the contact region 42. The contact region 42 in which the duplicate is located may be referred to as a mini-map. The touch sensitive device 10 may generate the tactile feedback of the duplicate in the contact region 42 to inform the user that the shape of the tactile object 41 is a star. The touch sensitive device 10 may remove the tactile feedback of the tactile object 41 from the contact region 42 in order to generate the tactile feedback of the duplicate 43. Accordingly, the user may perceive the shape of the tactile object 41 through the duplicate 43 of the tactile object even when the entire region of the tactile object 41 is not touched.

The touch sensitive device 10 may maintain the duplicate 43 of the mini-map even when a part of the contact region 42 deviates from the region of the tactile object 41. The touch sensitive device 10 may maintain the duplicate 43 of the mini-map when the contact region is included in the region of the tactile object 41 by a predetermined ratio or more. In the left lower side of FIG. 4, the touch sensitive device 10 may maintain the duplicate 43 of the mini-map even when a part of the contact region 42 deviates from the region of the tactile object 41. The touch sensitive device may stop provision of the mini-map when the contact region is included in the region of the tactile object 41 by less than a predetermined ratio as shown in the right lower side of FIG. 4. The touch sensitive device 10 may remove the duplicate 43 located in the contact region 42. The touch sensitive device 10 may generate the feedback of the tactile object 41 in the contact region 42.

In the right upper side of FIG. 4, the touch sensitive device 10 may generate tactile feedback of a tactile object having a rectangular shape. If the region of the tactile object 44 includes a contact region 45, the touch sensitive device 10 may locate, in the contact region 45, a duplicate 46 of the tactile object 44 including the contact region 45. The contact region 45 in which the duplicate is located may be referred to as a mini-map. The touch sensitive device 10 may generate the tactile feedback of the duplicate in the contact region 45 to inform the user that the tactile object 44 is rectangular. The touch sensitive device 10 may remove the tactile feedback of the tactile object 44 from the contact region 45 in order to generate the tactile feedback of the tactile object 44. Accordingly, the user may perceive the shape of the tactile object 44 through the duplicate 45 of the tactile object even when the entire region of the tactile object 44 is not touched.

Figure 5:
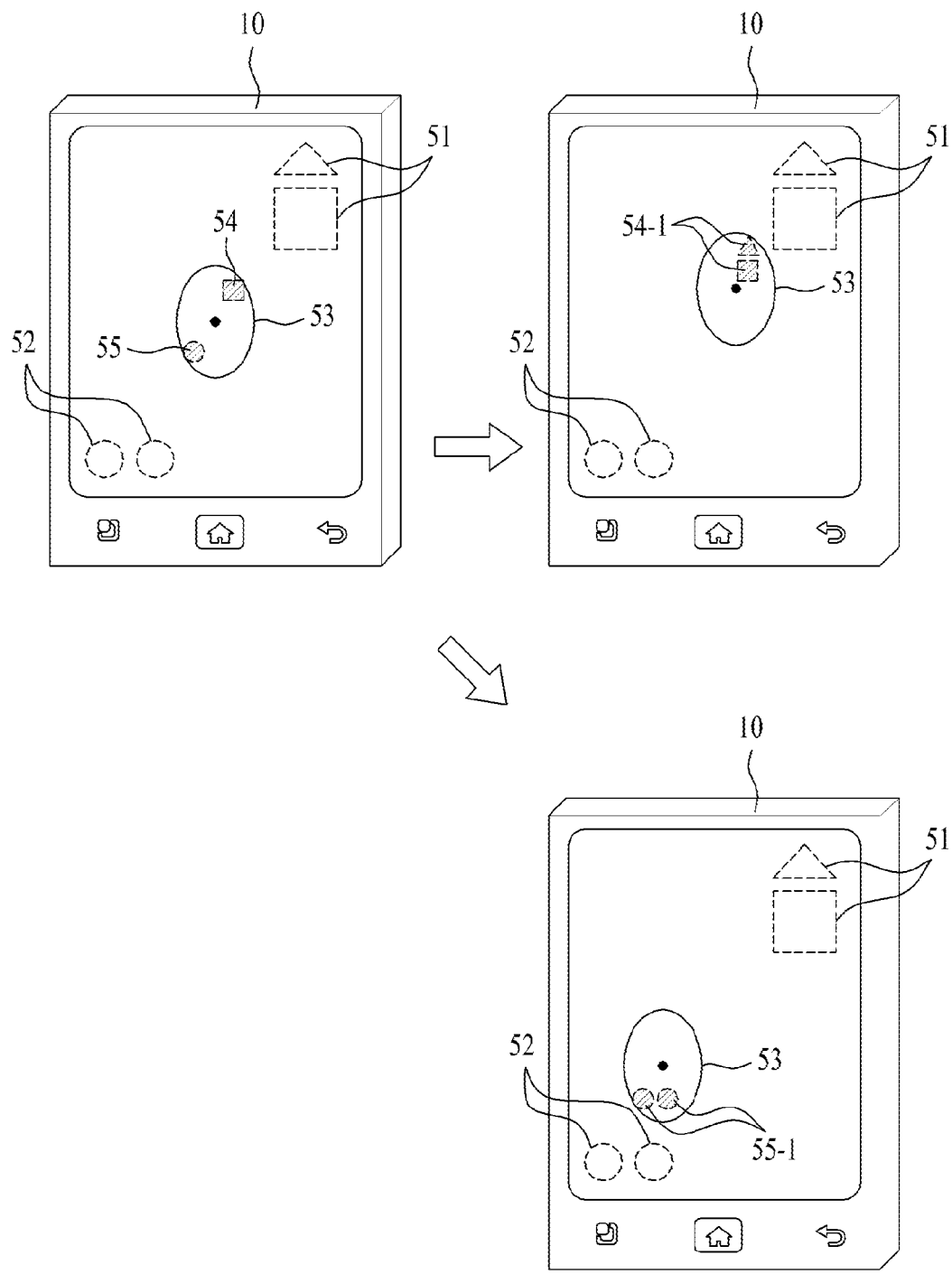
FIG. 5 is a diagram illustrating a method of generating a representative duplicate according to an embodiment of the present specification.

FIG. 5 is a diagram illustrating a method of generating a representative duplicate according to an embodiment of the present specification. The touch sensitive device 10 may generate tactile feedback of a tactile object group on the touch sensitive panel. The touch sensitive device 10 may group a plurality of tactile objects located close to each other in one direction from a contact region on the touch sensitive panel and set the plurality of tactile objects as a tactile object group. The touch sensitive device 10 may generate tactile feedback of a mini-map in the contact region on the touch sensitive panel. The touch sensitive device 10 may include a duplicate of the tactile object group in the mini-map. The duplicate corresponding to the tactile object group may include at least one of a representative duplicate and a detailed duplicate. The touch sensitive device 10 may set the duplicate corresponding to the tactile object group as a representative duplicate and set a duplicate corresponding to an individual tactile object included in each tactile object group as a detailed duplicate. The touch sensitive device 10 may locate the representative duplicate or the detailed duplicate in the mini-map according to a distance between the contact region and each tactile object group.

For example, the touch sensitive device 10 may locate the representative duplicate corresponding to the tactile object group in the mini-map if the distance between the tactile object group and the contact region is equal to or greater than a predetermined distance. If the distance between the tactile object group and the contact region is less than the predetermined distance, the touch sensitive device 10 may locate the detailed duplicate corresponding to the tactile object included in the tactile object group in the mini-map. The representative duplicate may be located in the mini-map and may have a shape and size similar to that of one of a plurality of detailed duplicates belonging to the same tactile object group.

In the left upper side of FIG. 5, the touch sensitive device 10 may locate a first tactile object group 51 and a second tactile object group 52 on the touch sensitive panel. Each of the first tactile object group 51 and the second tactile object group 52 may include two tactile objects. According to the embodiment, the touch sensitive device 10 may group a plurality of tactile objects into one tactile object group when the plurality of tactile objects are located in the same direction from the contact region. The touch sensitive device 10 may measure a distance between the contact region and each tactile object group. If the measured distance is equal to or greater than a predetermined distance, the touch sensitive device 10 may generate tactile feedback of a representative duplicate in a mini-map located in the contact region 53. The touch sensitive device 10 may locate a first representative duplicate 54 corresponding to the first tactile object group 51 and a second representative duplicate 55 corresponding to the second tactile object group 52. In addition, the touch sensitive device 10 may generate tactile feedback of the first representative duplicate and the second representative duplicate in the contact region. The first representative duplicate and the second representative duplicate may be located in the mini-map and may respectively have a shape and size similar to that of one of a plurality of detailed duplicates belonging to the first tactile object group and the second tactile object group.

In the right upper side of FIG. 5, when the position of the contact region is moved, the touch sensitive device 10 may change the duplicate included in the mini-map. If the contact region is detected at a position having less than the predetermined distance from the first tactile object group, the touch sensitive device 10 may change the first representative duplicate 54 to two first detailed duplicates 54-1. The touch sensitive device 10 may generate tactile feedback of the two first detailed duplicates 54-1 and inform the user that two tactile objects 51 are present in the first tactile object group. The touch sensitive device 10 may remove the second representative duplicate 55 from the mini-map and not generate the tactile feedback of the second representative duplicate 55.

In the right lower side of FIG. 5, when the position of the contact region is moved, the touch sensitive device 10 may change the duplicate included in the mini-map. If the contact region is detected at a position having less than the predetermined distance from the second tactile object group, the touch sensitive device 10 may change the second representative duplicate 55 to two second detailed duplicates 55-1. The touch sensitive device 10 may generate tactile feedback of the two second detailed duplicates 55-1 and inform the user that two tactile objects 52 are present in the second tactile object group. The touch sensitive device 10 may remove the first representative duplicate 54 from the mini-map and not generate the tactile feedback of the first representative duplicate 54.

The touch sensitive device 10 may locate a representative duplicate in the mini-map with respect to a tactile object group located at the predetermined distance or more from the contact region. In addition, the touch sensitive device 10 may locate a detailed duplicate in the mini-map with respect to a tactile object group located at less than the predetermined distance from the contact region and generate tactile feedback. Therefore, the user may perceive how far the contact region is located from each tactile object group and which tactile object is included in the tactile object group through the detailed duplicate.

Figure 6:
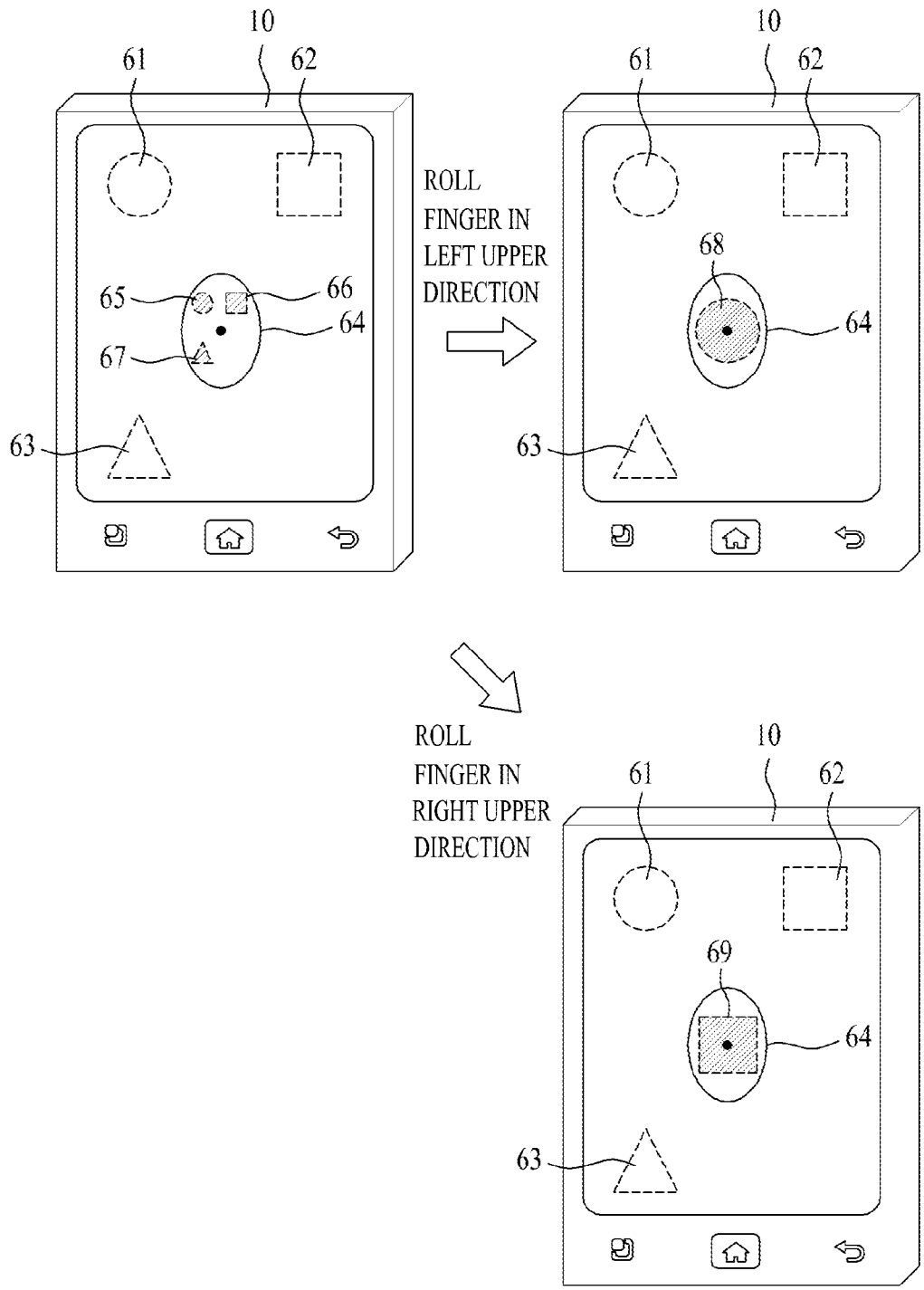
FIG. 6 is a diagram illustrating a method of providing a mini-map if a user's finger which contacts a touch panel is rolled according to an embodiment of the present specification.

FIG. 6 is a diagram illustrating a method of providing a mini-map if a user's finger which, contacts a touch panel is rolled according to an embodiment of the present specification. The touch sensitive device 10 may detect that the user's finger is rolled on the touch sensitive panel using a sensor unit. The touch sensitive device 10 may detect a direction in which the user's finger is rolled. The touch sensitive device 10 may detect change in position of the contact region and change in position of the center of the contact region to detect a direction in which the finger is rolled. The touch sensitive device 10 may change the duplicate included in the mini-map according to the detected direction in which the finger is rolled.

For example, the touch sensitive device 10 may include, in the mini-map, a remote duplicate of a tactile object located in a direction in which the user's finger is rolled. The touch sensitive device 10 may remove the duplicates of tactile objects located in directions other than the rolling direction or may not generate the tactile feedback of the duplicates. The remote duplicate may include the same function as the tactile object unlike other duplicates. Accordingly, if the user touches the remote duplicate, the touch sensitive device 10 may perform the same operation as when the user touches the tactile object. That is, if the user touches the remote duplicate of the tactile object, the touch sensitive device 10 may execute an application corresponding to the tactile object or execute a function for controlling the device. The touch sensitive device 10 may generate the same tactile feedback as the tactile object with respect to the remote duplicate of the tactile object.

In the left upper side of FIG. 6, the touch sensitive device 10 may locate a first tactile object 61, a second tactile object 62 and a third tactile object 63 on the touch sensitive panel. The touch sensitive device 10 may generate tactile feedback of a mini-map in a contact region 64 on the touch sensitive panel. The touch sensitive device 10 may locate, in the contact region 64, a first duplicate 65 corresponding to the first tactile object 61, a second duplicate 66 corresponding to the second tactile object 62 and a third duplicate 67 corresponding to the third tactile object 63. The touch sensitive device 10 may locate the first duplicate 65 in the direction of the first tactile object 61, locate the second duplicate 66 in the direction of the second tactile object 62 and locate the third duplicate 67 in the direction of the third tactile object 63, based on the center of the contact region in the contact region 64.

When the user rolls their finger in the left upper direction, in which the first tactile object 61 is located, of the touch sensitive panel, the touch sensitive device 10 may locate a first remote duplicate 68 corresponding to the first tactile object 61 in the left upper direction in the contact region as shown in the right upper side of FIG. 6. Therefore, the touch sensitive device 10 may generate tactile feedback of the first remote duplicate 68 in the contact region. In addition, when the tactile feedback of the first remote duplicate 68 is generated, the touch sensitive device 10 may remove at least one of the second duplicate 66 and the third duplicate 67 from the contact region. When the user performs touch input for activating the first remote duplicate 68, the touch sensitive device 10 may execute the function of the first tactile object 61. For example, the touch sensitive device 10 may execute an application corresponding to the first tactile object or change settings of the touch sensitive device 10 controlled by the first tactile object.

When the user rolls their finger in the right upper direction, in which the second tactile object 62, of the touch sensitive panel, the touch sensitive device 10 may locate a remote duplicate of the second tactile object located at the right upper direction as shown in the right lower side of FIG. 6. That is, the touch sensitive device 10 may generate tactile feedback of the second remote duplicate 69 in the contact region. In addition, when the tactile feedback of the second remote duplicate 69 is generated, the touch sensitive device 10 may remove at least one of the first duplicate 65 and the third duplicate 67 from the contact region. When the user performs touch input for activating the second remote duplicate 69, the touch sensitive device 10 may execute the function of the second tactile object 62. For example, the touch sensitive device 10 may execute an application corresponding to the second tactile object or change settings of the touch sensitive device 10 controlled by the second tactile object.

The touch sensitive device 10 may receive touch input for the remote duplicate of the tactile object and execute an application corresponding to the tactile object or execute a function for controlling the device. Therefore, the user may execute the function of the tactile object using the remote duplicate even when the contact region is not moved.

Figure 7:
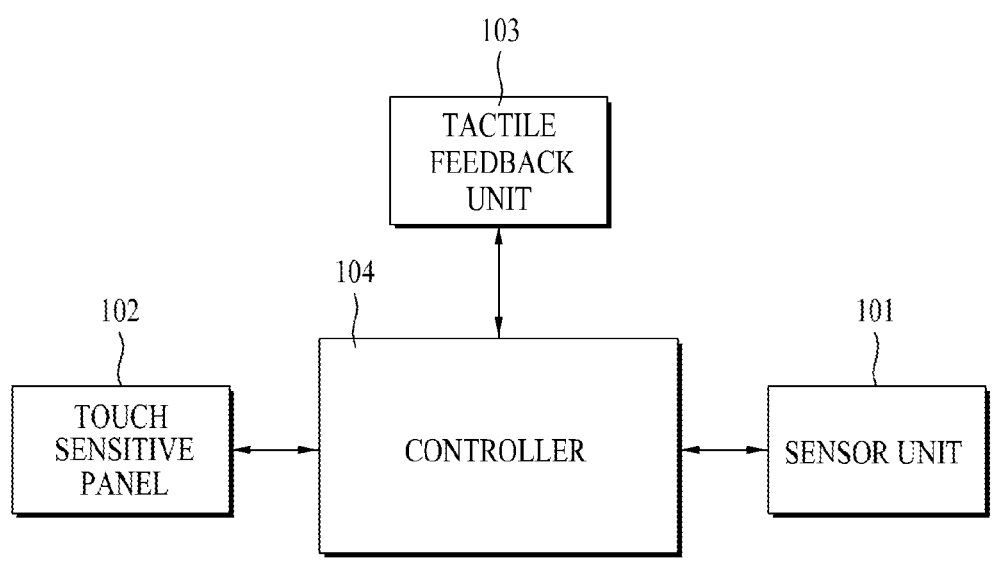
FIG. 7 is a block diagram showing a touch sensitive device according to an embodiment of the present specification.

FIG. 7 is a block diagram showing a touch sensitive device according to an embodiment of the present specification. The touch sensitive device may include a sensor unit 101, a touch sensitive panel 102, a tactile feedback unit 103 and a controller 104.

The sensor unit 101 may sense user input using at least one sensor mounted in the touch sensitive device, convert the sensed user input into an electrical signal, and send the electrical signal to the controller 104. The sensor unit 101 may include at least one sensor. In one embodiment, a plurality of sensors may include at least one of a piezoelectric sensor, a pressure sensor and a capacitive touch sensor. In the present specification, the touch sensitive device may detect user touch input using at least one of a piezoelectric sensor, a pressure sensor and a capacitive touch sensor. The sensor unit 101 may generate contact region information according to the sensed touch input or the pressure of the touch input and transmit the contact region information to the controller 104. In addition, the controller 104 may generate a control signal to control the touch sensitive device using the transmitted contact region information. The above-described sensors may be included in the touch sensitive device as separate elements or may be combined with one or more elements and included in the touch sensitive device.

The sensor unit 101 may detect which position of the touch sensitive panel the user's finger contacts. The sensor unit 101 may set a region in which the finger is detected as the contact region and generate information about the contact region as contact region information. The sensor unit 101 may transmit the contact region information to the controller 104 and the controller 104 may determine in which region of the touch sensitive panel the mini-map of the tactile user interface is located. The sensor unit 101 may track the contact region, update the contact region information if the position of the contact region is changed, and send the updated contact region information to the controller 104. In addition, the sensor unit 101 may sense rolling of the user's finger on the touch sensitive panel. The sensor unit 101 may sense movement of at least one of the contact region and the center of the contact region and include the sensed movement in the contact region information. The controller may determine in which direction the user's finger is rolled from the contact region information.

The touch sensitive panel 102 may be located on the surface of the touch sensitive device to sense user touch input and provide tactile feedback to the user. The touch sensitive panel 102 may serve as a medium for exchanging information between the user and the touch sensitive device. The sensor unit may sense user touch input through the touch sensitive panel 102 and the tactile feedback unit may provide tactile feedback to the user through the touch sensitive panel 102. The touch sensitive panel 102 may convert the user touch input into an electrical signal using a capacitive or pressure sensitive method.

The touch sensitive panel 102 may be combined with at least one of the above-described sensor unit 101 and the below-described tactile feedback unit 103 and may be mounted in the touch sensitive device as one element. In addition, according to the embodiment, the touch sensitive panel 102 may include a display unit. The touch sensitive panel 102 including the display unit may provide a visual interface to the user along with a tactile user interface. The touch sensitive panel may display a graphical interface corresponding to the tactile user interface. In this case, the user may perceive a visual or tactile user interface using the touch sensitive panel 102.

The tactile feedback unit 103 may provide the tactile user interface to the user. The user may confirm the tactile user interface on the touch sensitive panel 102 and thus control the touch sensitive device. The method of providing the tactile user interface to the user by the tactile feedback unit 103 is as follows. It is possible to provide tactile feedback to the user's finger which touches the touch sensitive panel using a minute-vibration actuator. The tactile feedback unit 103 may control a vibration frequency and a vibration magnitude and thus control the strength of the tactile feedback between the user's finger and the touch sensitive device. According to another embodiment, the tactile feedback unit 103 may generate minute current on the display unit and provide tactile feedback to the user. The tactile feedback unit 103 may control the strength of current and a current generation period. Thus, the user may feel other tactile sensation. In addition, the tactile feedback unit 103 may provide tactile feedback using ultrasonic resonance. The tactile feedback unit 103 may generate a plurality of ultrasonic waves, produces resonance of the plurality of ultrasonic waves in a specific region, and provide the tactile feedback to the user. The tactile feedback unit 103 may control the magnitude of the resonance frequency and a resonance period and provide different tactile feedback.

The tactile feedback unit 103 may generate the tactile feedback of at least one of a tactile object, a duplicate of the tactile object and a mini-map on the touch sensitive panel. The tactile feedback unit 103 may receive a signal for a region, in which tactile feedback will be generated, from the controller and generate tactile feedback in the region. The tactile feedback unit 103 may generate tactile feedback in correspondence with the positions of the tactile object, the duplicate of the tactile object, the contact region and the mini-map. The tactile feedback unit 103 may selectively generate the tactile feedback only in the contact region in which user contact is detected.

The controller 104 may execute various applications and process internal data of the touch sensitive device. The controller 104 may control the units of the touch sensitive device and manage data transmission and reception between the units. In the present specification, the controller 104 may receive contact region information from the sensor unit 101 and generate a control signal for a tactile user interface in correspondence with the received contact region information. The controller 104 may track movement of the contact region from the updated contact region information and thus determine the position of the mini-map on the touch sensitive panel 102. In addition, the controller 104 may determine the positions of the duplicates in the mini-map based on the position relationship between the contact region and each tactile object as described with reference to FIG. 2. In addition, the controller 104 may change the duplicate included in the mini-map according to the overlap ratio between the contact region and the tactile object as described with reference to FIG. 3. The controller 104 may measure the distance between the contact region and each tactile object and individually generate a representative duplicate or a detailed duplicate as described with reference to FIG. 5. In addition, the controller 104 may generate a remote duplicate using information about rolling of the user's finger included in the contact region information as described with reference to FIG. 6.

FIG. 7 is the block diagram of one embodiment of the present specification, in which individual blocks respectively show logically divided elements of the touch sensitive device. Accordingly, the elements of the touch sensitive device may be mounted as a single chip or a plurality of chips according to design of the touch sensitive device.

Figure 8:
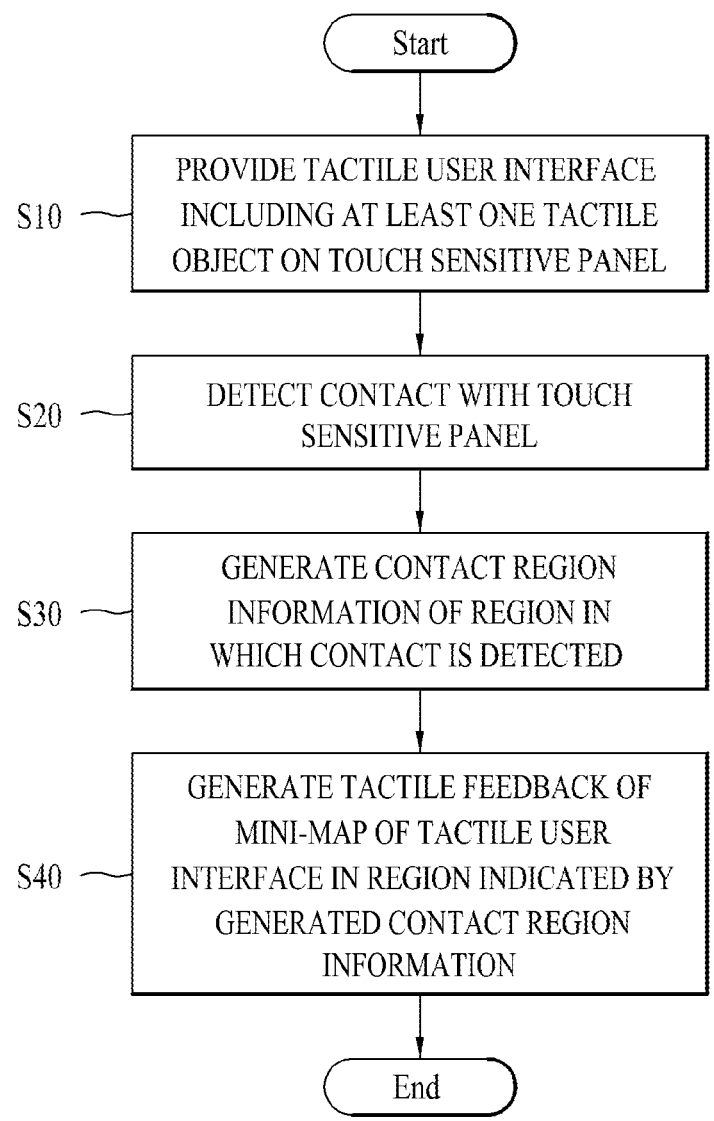
FIG. 8 is a flowchart illustrating a method of providing a mini-map of a touch sensitive device according to an embodiment of the present specification.

FIG. 8 is a flowchart illustrating a method of providing a mini-map of a touch sensitive device according to an embodiment of the present specification. The touch sensitive device may provide a tactile user interface including at least one tactile object using a touch sensitive panel (S10). The touch sensitive device may further use a tactile feedback unit when providing the tactile user interface. The touch sensitive device may locate at least one tactile object included in the tactile user interface on the touch sensitive panel. The tactile object may include a soft button and may be activated by user touch input. If the tactile object is activated, the touch sensitive device may execute a function corresponding to the tactile object. That is, if the tactile object is an icon of a specific application, the touch sensitive device may execute an application corresponding to the tactile object. If the tactile object is a control button for a device, the touch sensitive device may execute a control function for a touch sensitive device corresponding to the tactile object.

The touch sensitive device may detect contact with the touch sensitive panel using a sensor unit (S20). The touch sensitive device may detect user contact with the touch sensitive panel if the user touches the touch sensitive panel. The touch sensitive device may generate information about the detected contact region as contact region information. The touch sensitive device may generate contact region information of the contact region using the sensor unit (S30). The touch sensitive device may include at least one of the position information of the contact region, the position information of the center of the contact region and the area information of the contact region in the contact region information as described above with reference to FIGS. 1 and 2. As described with reference to FIG. 6, the touch sensitive device may sense rolling of the user's finger on the touch sensitive panel. The touch sensitive device may include information about rolling of the user's finger in the contact region information. The touch sensitive device may sense movement of at least one of the contact region and the center of the contact region and include the sensed movement in the contact region information.

The touch sensitive device may generate tactile feedback of a mini-map of a tactile user interface using the tactile feedback unit in the contact region indicated by the generated contact region information (S40). As described with reference to FIG. 1, the touch sensitive device may provide the mini-map of the tactile user interface to the user. The touch sensitive device may generate the tactile feedback of the mini-map using the tactile feedback unit. The mini-map of the tactile user interface is a miniature of the tactile user interface. The touch sensitive device may reduce the tactile user interface on the touch sensitive panel to generate the mini-map. The touch sensitive device may include the duplicate of the tactile object in the mini-map.

The position of the duplicate of the tactile object may be determined by the distance and position relationship between the contact region and the tactile object. As described with reference to FIG. 2, the touch sensitive device may determine the distance between the center of the contact region and the duplicate in correspondence with the distance between the contact region and the tactile object. In addition, the touch sensitive device may determine the direction in which the duplicate is located according to the direction in which the tactile object is located from the center of the contact region. That is, the duplicate of the tactile object may indicate the direction from the contact region to the tactile object. Accordingly, the user may perceive the position and direction of the tactile object based on the position and direction of the duplicate included in the mini-map.

The touch sensitive device may change the duplicate in the mini-map if the tactile object and the contact region overlap as described with reference to FIG. 3. The touch sensitive device may remove at least one duplicate from the mini-map according to the overlap ratio. In addition, the touch sensitive device may generate the tactile feedback of the tactile object instead of the mini-map if the tactile object and the contact region overlap by a predetermined ratio or more.

The touch sensitive device may provide the duplicate indicating the reduced size and shape of the tactile object to the mini-map if the contact region is within the region of the tactile object, as described with reference to FIG. 4. Therefore, the user may perceive the shape of the tactile object having a region larger than the contact region through the duplicate of the mini-map.

The touch sensitive device may group a plurality of tactile objects and set the plurality of tactile objects as one tactile object group, if the plurality of tactile objects is located in the same or similar direction as the contact region, as described with reference to FIG. 5. The touch sensitive device may change the duplicate included in the mini-map according to the distance between the tactile object group and the contact region. That is, the touch sensitive device may locate a representative duplicate corresponding to the tactile object group in the mini-map if the distance between the tactile object group and the contact region is equal to or greater than a predetermined distance. In addition, the touch sensitive device may locate a detailed duplicate corresponding to each tactile object included in the tactile object group in the mini-map if the distance between the tactile object group and the contact region is less than a predetermined distance. Accordingly, the user may perceive the distance to the tactile object group through the representative duplicate and perceive the number of tactile objects included in the tactile object group through the detailed duplicate.

For example, the touch sensitive device may locate a first tactile object and a second tactile object on the touch sensitive panel. In addition, the touch sensitive device may locate a first duplicate corresponding to the first tactile object and a second duplicate corresponding to the second tactile object in the contact region. The touch sensitive device may group the first tactile object and the second tactile object into one tactile group when the first tactile object and the second tactile object are located in the same direction from the contact region. The touch sensitive device may remove the first duplicate and the second duplicate from the mini-map and provide a third duplicate corresponding to the tactile object if the distance to the tactile object group is equal to or greater than the predetermined distance. The third duplicate may become a representative duplicate.

The touch sensitive device may locate a remote duplicate in the mini-map based on information about rolling of the user's finger included in the contact region information, as described with reference to FIG. 6. The touch sensitive device may determine the rolling direction of the user's finger from the information about movement of at least one of the contact region and the center of the contact region. The touch sensitive device may include the remote duplicate of the tactile object located in the rolling direction of the user's finger in the mini-map. The touch sensitive device may execute the function of the tactile object if user input for the remote duplicate is received. That is, the touch sensitive device may provide the remote duplicate for remotely controlling the tactile object separated from the contact region. Even when the user does not directly touch the tactile object, it is possible to control the tactile object using the remote duplicate in the contact region. For example, the touch sensitive device may locate a first tactile object and a second tactile object on the touch sensitive panel. When the first tactile object and the second tactile object are located in different directions from the contact region and the user's finger is rolled such that the contact region information is moved in the direction in which the first tactile object is located, the touch sensitive device may remove the second duplicate from the mini-map and maintain the first duplicate. In addition, when the user's finger is rolled such that the contact region information is moved in the direction in which the second tactile object is located, the touch sensitive device may remove the first duplicate from the mini-map and maintain the second duplicate.

As described above, the touch sensitive device provides the mini-map of the tactile user interface on the touch sensitive panel such that the user can easily perceive and control the tactile user interface. Accordingly, the user may perceive the direction of the tactile object and the distance to the tactile object through the mini-map without moving the touch region in order to detect the tactile objects distributed on the touch sensitive panel.

According to the present specification, the touch sensitive device can provide summary information of a tactile user interface to a user.

According to the present specification, the touch sensitive device can provide tactile feedback of a mini-map of the tactile user interface to the user.

According to the present specification, the touch sensitive device can provide information about in which direction a tactile object is located in a contact region touched by the user.

According to the present specification, the touch sensitive device can provide information about a relative distance from the contact region touched by the user to a region in which the tactile object is located.

According to the present specification, the touch sensitive device can generate a duplicate by reducing the size of the tactile object and provide tactile feedback of the duplicate to the user.

According to the present specification, the touch sensitive device may group a plurality of tactile objects, generate one duplicate and provide tactile feedback of one duplicate to the user.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

What is claimed is:

1. A touch sensitive device comprising:
   a touch sensitive panel configured to provide a tactile user interface including at least one tactile object;
   a sensor unit configured to detect contact with the touch sensitive panel and generate contact region information of a contact region in which the contact is detected;
   a tactile feedback unit configured to generate tactile feedback of a mini-map of the tactile user interface in the contact region indicated by the generated contact region information; and
   a controller configured to control the touch sensitive panel, the sensor unit, the tactile feedback unit and the tactile user interface,
   wherein the mini-map of the tactile user interface includes a duplicate of the tactile object provided on the touch sensitive panel, and
   wherein the duplicate of the tactile object indicates a direction from the contact region indicated by the contact region information to the tactile object.

2. The touch sensitive device according to claim 1, wherein:
   the tactile user interface includes a first tactile object and a second tactile object, and
   the mini-map of the tactile user interface includes a first duplicate corresponding to the first tactile object and a second duplicate corresponding to the second tactile object.

3. The touch sensitive device according to claim 2, wherein:
   when the first tactile object and the second tactile object are located in different directions from the contact region indicated by the contact region information,
   the second duplicate is removed from the mini-map and the first duplicate is maintained if the contact region is moved in a direction in which the first tactile object is located, and
   the first duplicate is removed from the mini-map and the second duplicate is maintained if the contact region is moved in a direction in which the second tactile object is located.

4. The touch sensitive device according to claim 2, wherein, when the first tactile object and the second tactile object are located in the same direction from the contact region indicated by the contact region information and distances from the contact region indicated by the contact region information to the first tactile object and the second tactile object are equal to or greater than a predetermined distance,
   the controller removes the first duplicate and the second duplicate from the mini-map, groups the first tactile object and the second tactile object, and includes a third duplicate corresponding to the grouped first and second tactile objects in the mini-map.

5. The touch sensitive device according to claim 4, wherein the third duplicate is equal to the first duplicate or the second duplicate in terms of at least one of position, shape and size.

6. The touch sensitive device according to claim 4, wherein, if the distances from the contact region indicated by the contact region information to the first tactile object and the second tactile object are reduced to be less than the predetermined distance, the controller removes the third duplicate from the mini-map and includes the first duplicate and the second duplicate in the mini-map.

7. The touch sensitive device according to claim 1, wherein, if the contact region indicated by the contact region information overlaps the tactile object by a ratio within a first ratio range, the controller removes the duplicate of the overlapped tactile object from the mini-map of the tactile user interface.

8. The touch sensitive device according to claim 1, wherein, if the contact region indicated by the contact region information overlaps the tactile object by a ratio within a second ratio range, the tactile feedback unit removes the tactile feedback of the mini-map of the tactile user interface and generates tactile feedback of the overlapped tactile object.

9. The touch sensitive device according to claim 1, wherein, if the contact region indicated by the contact region information is included in a region of the tactile object, the duplicate of the tactile object indicates a reduced size and shape of the tactile object.

10. The touch sensitive device according to claim 1, wherein the mini-map includes the duplicate of the tactile object on a virtual line connecting the center of the contact region indicated by the contact region information and the tactile object.

11. The touch sensitive device according to claim 1, wherein the controller sets the position of the duplicate of the tactile object in the mini-map according to a distance from the center of the contact region indicated by the contact region information to the tactile object.

12. The touch sensitive device according to claim 1, wherein:
   the controller divides the contact region indicated by the contact region information into a plurality of sub contact regions, and
   the tactile feedback unit generates tactile feedback with respect to sub contact regions of a direction, in which the tactile object is located, among the plurality of sub contact regions.

13. The touch sensitive device according to claim 12, wherein the tactile feedback unit generates different tactile feedback with respect to sub contact regions in the direction, in which the tactile object is located, among the plurality of sub contact regions.

14. The touch sensitive device according to claim 12, wherein the tactile feedback unit controls the strength of the tactile feedback according to the distance between the sub contact region of the direction, in which the tactile object is located, and the tactile object.

15. The touch sensitive device according to claim 1, wherein the touch sensitive panel includes a touch sensitive display for displaying a graphical user interface.

16. The touch sensitive device according to claim 15, wherein the touch sensitive display displays the graphical user interface corresponding to the tactile user interface.

17. The touch sensitive device according to claim 1, wherein the duplicate of the tactile object is generated by reducing the tactile object.

18. The touch sensitive device according to claim 1, wherein the tactile object includes a soft button with a function for controlling the touch sensitive device or an application executed in the touch sensitive device.

19. The touch sensitive device according to claim 1, wherein the mini-map of the tactile user interface indicates a relative distance from the contact region indicated by the contact region information to the tactile object.

20. A method of controlling a touch sensitive device, the method comprising:
  providing a tactile user interface including at least one tactile object on a touch sensitive panel;
  detecting contact with the touch sensitive panel and generating contact region information of a contact region in which the contact is detected; and
  generating tactile feedback of a mini-map of the tactile user interface in the contact region indicated by the generated contact region information,
  wherein the mini-map of the tactile user interface includes a duplicate of the tactile object provided on the touch sensitive panel, and
  wherein the duplicate of the tactile object indicates a direction from the contact region indicated by the contact region information to the tactile object.

* * * * *